Figure 1:
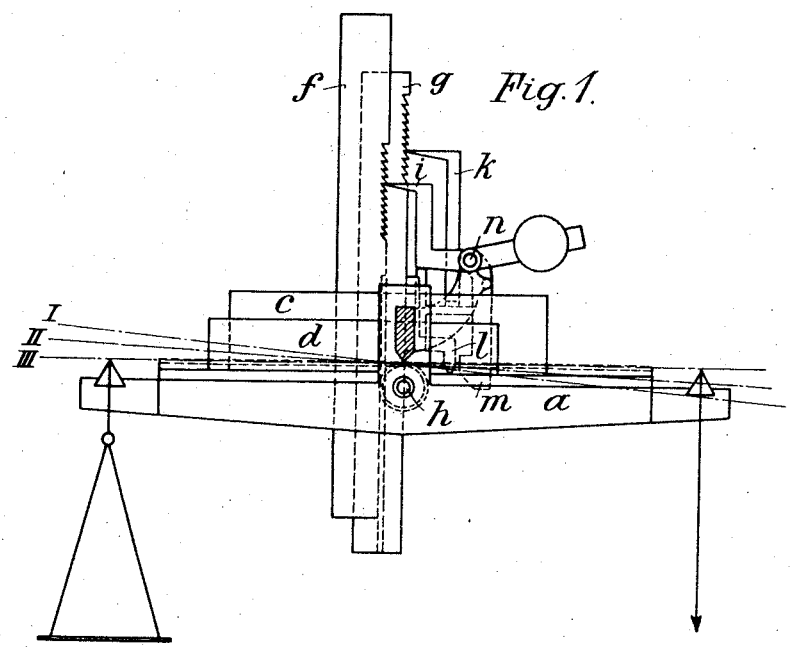

G. DARMSTÄDTER.
AUTOMATIC BALANCE WITH SLIDING WEIGHTS.
APPLICATION FILED JAN. 18, 1912.

1,024,881.

Patented Apr. 30, 1912.

UNITED STATES PATENT OFFICE.

GEORG DARMSTÄDTER, OF DARMSTADT, GERMANY.

AUTOMATIC BALANCE WITH SLIDING WEIGHTS.

1,024,881. Specification of Letters Patent. Patented Apr. 30, 1912.

Application filed January 18, 1912. Serial No. 671,984.

*To all whom it may concern:*

Be it known that I, GEORG DARMSTÄDTER, a subject of the Grand Duke of Hessen, residing at Darmstadt, in the Empire of Germany, have invented a new and useful Automatic Balance with Sliding Weights, of which the following is a specification.

There are known automatic balances, in which several sliding-weights are disposed on separate balance-beams, that are connected with one another by means of rods and levers. The sliding-weights on the several balance-beams in such automatic balances are made to move in different directions during weighing, that is either toward or away from the side of load. In other known automatic balances several sliding-weights are disposed on one balance-beam, which however consists of several superposed loose parts. On each of these loose parts is disposed one sliding-weight and the several sliding-weights do not possess any driving means but simply slide down by reason of their own weight on inclined paths on the loose parts being raised on one side. Finally in other known automatic balances several balance beams each carrying one separate sliding-weight are disposed and are connected with one another by means of levers and rods, so as to form a balance of several ranks.

My invention relates to an improved automatic balance possessing one single balance-beam forming a rigid whole and several sliding-weights movable on this balance-beam, which sliding-weights have separate driving means adapted to act one after the other and dependently upon one another.

The known constructions of the first described kind are mostly very complicated and can consequently be operated and maintained only with great difficulty. Not only are the costs of production of such automatic balances elevated, but also their construction is rendered less reliable and durable by the many loose parts and the large number of knife-edges.

By reason of the new simpler device it is rendered possible to weigh great loads with the maximum exactitude. For example in an automatic balance capable of weighing 20,000 kilograms the smallest division amounts up to 1 kilogram only, while only two sliding-weights are necessary. The weighing of the load is effected by making the large sliding-weight so as to balance loads in divisions of 100 kilograms each, while the small sliding-weight is adapted to weigh loads by divisions of 1 kilogram each. Larger loads up to any limit may be weighted by means of further additional sliding-weights on the single balance-beam, provided that a great exactitude of the weighing is not sacrificed.

I will now proceed to describe my invention with reference to the accompanying drawing, in which—

Figure 2:
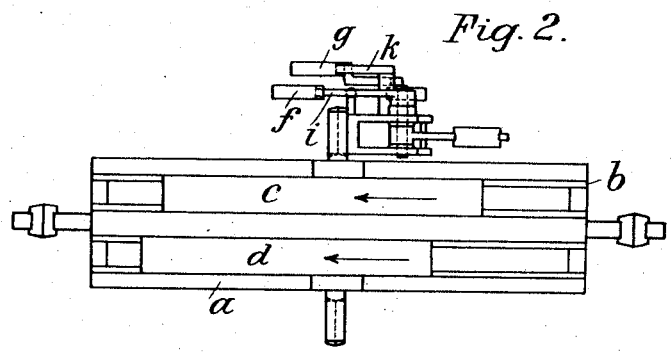

Figure 1 is an elevation of a balance-beam with two sliding-weights and the parts connected therewith, which balance-beam forms one part of an automatic balance of any approved construction (not shown), and Fig. 2 is a plan view of the same.

Similar letters of reference refer to similar parts in both views.

The balance-beam $a$ is constructed similar to a frame and comprises two parallel guides $b$ for two sliding-weights $c$ and $d$. The motion of the sliding-weights $c$ and $d$ in the direction of the arrows is effected by means of two driving weights $f$ and $g$ which for their lower half form racks that mesh with pinions disposed on a shaft $h$, while other pinions, one loose and the other fast on the shaft $h$, are made to mesh with racks provided on the underside of the sliding-weights $c$ and $d$. The stoppage of the sliding-weights $c$ and $d$ is for example effected by means of two pawls $i$ and $k$ adapted to severally engage in corresponding racks provided on the upper part of the two driving weights $f$ and $g$. Pawl $i$ is pivoted at $n$ to an arm projecting upwardly from balance beam $a$ and is counterweighted so as to be swung away from the coöperating rack of weight $f$ when the balance beam $a$ occupies the position 1 (Fig. 1), *i. e.*, when the article to be weighed is suspended from or otherwise secured to the right hand arm of beam $a$. Weight $g$ is provided with an abutment or heel $l$ which rests upon a hook $m$ depending from pawl $i$ when weight $g$ occupies its uppermost position, *i. e.*, before weighing took place. The pawl $k$ is fast on balance beam $a$ and enters the rack of weight $g$ only after pawl $i$ has engaged the rack of weight $f$ as hereinafter more fully described.

The operation of the scale is as follows: After the article to be weighed has been suspended from the right arm of balance beam $a$, the latter will be tilted into the position 1 (Fig. 1), so as to swing both of the pawls $i$ and $k$ away from their respective weights $f$ and $g$. Weight $f$ is thus free to descend, while weight $g$ is locked in its raised position owing to the engagement of its heel $l$ with hook $m$ of pawl $i$. By the descent of weight $f$, sliding weight $c$ is shifted toward the left, until beam $a$ arrives at position II. At this moment, pawl $i$ which has participated in the tilting movement of beam $a$ has been advanced toward the rack of weight $f$ to such an extent that it is engaged by the tip of a tooth. The continued descent of weight $f$ will thus cause a slight tilting of pawl $i$ on its pivot $n$ until the point of the pawl has been swung against the root of the tooth, thereby checking the descent of weight $f$. This slight tilting movement of pawl $i$ is just sufficient to withdraw hook $m$ from heel $l$ of weight $g$. In this way the latter is now liberated and its descent will cause a corresponding advance of shifting weight $d$. As soon as the balance beam $a$ has arrived at its horizontal position III, pawl $k$ has been tilted to such an extent toward the rack of weight $g$ as to engage the same and thus check the further descent of weight $g$, thereby counterbalancing the load.

I claim:

1. In an automatic scale, a balance beam, a pair of sliding weights carried thereby, a pair of toothed driving weights, means for operatively connecting the driving weights to the sliding weights, a first pawl movably mounted on the balance beam and adapted to engage one of the driving weights, means controlled by said pawl for locking the other driving weight against descent, and a second pawl fast on the beam and adapted to engage said last named driving weight.

2. In an automatic scale, a balance beam, a pair of sliding weights carried thereby, a pair of toothed driving weights, means for operatively connecting the driving weights to the sliding weights, a first pawl movably mounted on the balance beam and adapted to engage one of the driving weights, a heel on the other driving weight, a hook on the first pawl adapted to engage said heel, and a second pawl fast on the beam and adapted to engage the last named driving weight.

GEORG DARMSTÄDTER.

Witnesses:
JEAN GRUND,
CARL GRUND.

Copies of this patent may be obtained for five cents each, by addressing the "Commissioner of Patents, Washington, D. C."